United States Patent [19]

Kaneko

[11] Patent Number: 5,511,735
[45] Date of Patent: Apr. 30, 1996

[54] SPINNING REEL FOR FISHING WITH DRAG OPERATION AND SPOOL FREE STATES

[75] Inventor: Kyoichi Kaneko, Tokyo, Japan

[73] Assignee: Daiwa Seiko, Inc., Tokyo, Japan

[21] Appl. No.: 227,879

[22] Filed: Apr. 15, 1994

[30] Foreign Application Priority Data

Apr. 16, 1993 [JP] Japan .................................. 5-112501

[51] Int. Cl.[6] ................................................. A01K 89/01
[52] U.S. Cl. ............................................ 242/245; 241/262
[58] Field of Search ................................... 242/243, 244, 242/245, 246, 257, 259, 262

[56] References Cited

U.S. PATENT DOCUMENTS

| | | | |
|---|---|---|---|
| 3,810,592 | 5/1974 | Host | 242/245 |
| 4,746,077 | 5/1988 | Toda | 242/245 |
| 4,821,977 | 4/1989 | Schuster | 242/243 |
| 5,064,138 | 11/1991 | Sato | 242/268 |
| 5,120,001 | 6/1992 | Kaneko | 242/246 |
| 5,186,412 | 2/1993 | Park | 242/243 |
| 5,195,698 | 3/1993 | Kyoichi | 242/246 |
| 5,199,664 | 4/1993 | Kuntze et al. | 242/246 |
| 5,240,202 | 8/1993 | Park | 242/246 |

FOREIGN PATENT DOCUMENTS 61-274638  12/1986  Japan .

Primary Examiner—Katherine Matecki
Attorney, Agent, or Firm—Longacre & White

[57] ABSTRACT

A spinning reel for fishing includes: a spool shaft which reciprocates in an axial direction in linking with rotation of a handle shaft wherein a spool is provided at a first axial end of the spool shaft and a drag mechanism is provided at a second axial end opposite from the first axial end; a switching mechanism for operatively coupling the drag mechanism to the spool shaft to establish one of a spool free state and a drag state; a clutch mechanism for operatively engaging the handle shaft with a drive gear to establish one of a torque transmission state wherein a rotor can be driven through the drive gear by the handle shaft and a rotor free state in which the rotor is free from the handle shaft; and a return mechanism provided between the switching mechanism and the clutch mechanism for returning both spool from the spool free state to the drag state and the rotor from the rotor free state to the torque transmission state, in linking with rotation of the handle shaft. It is possible to prevent the unnecessary rotation of the rotor at the time of switching the spool from the free state to the drag state.

4 Claims, 4 Drawing Sheets

SPINNING REEL FOR FISHING WITH DRAG OPERATION AND SPOOL FREE STATES

BACKGROUND OF THE INVENTION

The present invention relates to an improved spinning reel for fishing.

As disclosed in Japanese Patent Kokai Publication No. Sho. 61-274638, a conventional spinning reel for fishing is equipped with a mechanism whereby a drag mechanism is switched between a drag operation state and a spool free state and can be returned from the spool free state to the drag operation state in linking with a fishline winding operation of a reel handle.

The above-mentioned conventional mechanism, however, suffers from the following problems. When the drag mechanism is returned from the spool free state to the drag operation state by rotating the handle in the fishline winding direction, a rotor is inevitably rotated in linking with the handle rotation. That is to say, a rotor even rotated by handle can not wind a fishline onto the spool until the drag mechanism is switched into the drag state, and what is worse the unnecessary rotation of the rotor causes the twist and tangle of the fishline. In case that a braking force slightly greater than the tension of the fishline is intentionally applied to the spool with some means even under the spool free state to prevent the free feed of the fishline from the spool, the rotor may rotate several turns before being switched into a winding state, and may apply a force onto the fishline or wind the fishline onto the spool before the intended timing of the hooking operation. Thus, appropriate and accurate hooking operation can not be performed with this conventional reel, which results in the loss of fish.

SUMMARY OF THE INVENTION

The present invention was made in order to solve the problems found in the prior art. Accordingly, It is an objective of the present invention to provide a spinning reel for fishing in which unnecessary rotation of a rotor is prevented when a spool is switched from a free state to a drag state.

In order to attain the above-noted and other objectives, the present invention provides a spinning reel for fishing, which includes: a spool shaft which reciprocates in an axial direction in conjunction with rotation of a handle shaft wherein a spool is provided at a first axial end of the spool shaft and a drag mechanism is provided at a second axial end opposite from the first axial end; a switching mechanism for operatively coupling the drag mechanism to the spool shaft to establish one of a spool free state and a drag state; a clutch mechanism for operatively engaging the handle shaft with a drive gear to establish one of a torque transmission state wherein a rotor can be driven through the drive gear by the handle shaft and a rotor free state in which the rotor is free from the handle shaft; and a return mechanism provided between the switching mechanism and the clutch mechanism for returning the spool from the spool free state to the drag state and the rotor from the rotor free state to the torque transmission stage, in linking with rotation of the handle shaft.

If the drag mechanism is separated or disengaged from the spool shaft by the switching mechanism, the drive gear is disengaged from the handle shaft by the clutch mechanism through the action of the returning mechanism, and therefore the spool is switched into the spool free state whereas the drive gear is permitted to rotate relative to the handle shaft to establish the rotor free state. In this condition, the angler can await sudden tension on the line caused by a fish. Thereafter, the handle shaft is rotated upon the hit of a fish, the returning mechanism serves to connect the drive gear to the handle shaft through the clutch mechanism while connecting the drag mechanism to the spool shaft, so that the rotation of the handle shaft is transmitted to the rotor via the drive gear whereas the spool is put into a braking or drag state in which feed of the fishline from the spool is regulated by the drag mechanism.

DETAILED DESCRIPTION OF THE PREFERRED EMBODIMENT

Figure 1:
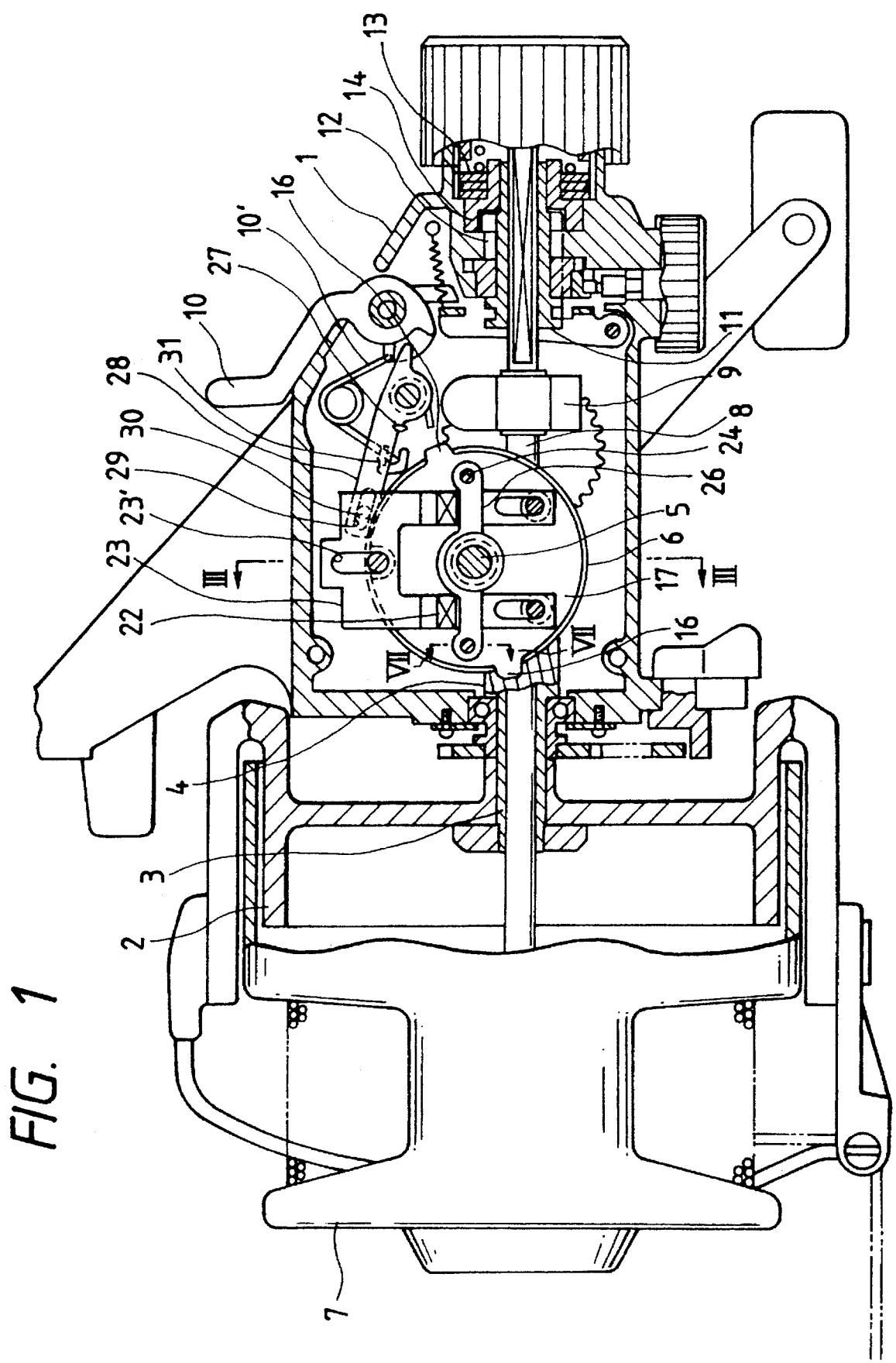
FIG. 1 is a partially cut-away frontal view showing a spinning reel in a drag operation state, which is an embodiment of the present invention.

A preferred embodiment of the present invention will now be described with reference to the drawings attached hereto.

FIGS. 1 to 8 show a spinning reel for fishing constructed in accordance with the present invention. In the spinning reel, a rotary quill 3 on which a rotor 2 is mounted is rotatably supported on a front portion of a reel casing 1 in a well-known manner. A pinion 4 formed on a rear end of the rotary quill 3 is meshed with a drive gear on a handle shaft 5. A spool shaft 8 having a spool 7 at its front end passes through the inside of the rotary quill 3. The spool shaft 8 is reciprocated in the axial direction thereof in linking with rotation of the drive gear 8 by a well-known reciprocating mechanism 9. An engagement cylinder 11 is non-rotatably but translatably fitted onto the rear end of the spool shaft 8 so as to be driven to move in the axial direction of the spool shaft 8 by a switching lever 10 which is biased in either of forward and backward direction by a spring 10' to present a dead point action. An engagement portion 12 formed on the engagement cylinder 11 is engageable with a coupling portion 14 of a drag mechanism 13 provided in a rear end of the reel casing 1. When the switching lever 10 is retained in a forward position shown in FIG. 1 by the action of the spring 10', the engagement portion 12 is engaged with the coupling portion 14 of the drag mechanism 13 so as to couple the spool shaft 8 with the drag mechanism 13. When the switching lever 10 is retained in the backward position shown in FIG. 2 by the action of the spring 10', the engagement portion 12 of the engagement cylinder 11 is disengaged from the coupling portion 14 of the drag mechanism 13 to separate or disconnect the spool shaft 8 from the drag mechanism 13.

Figure 4:
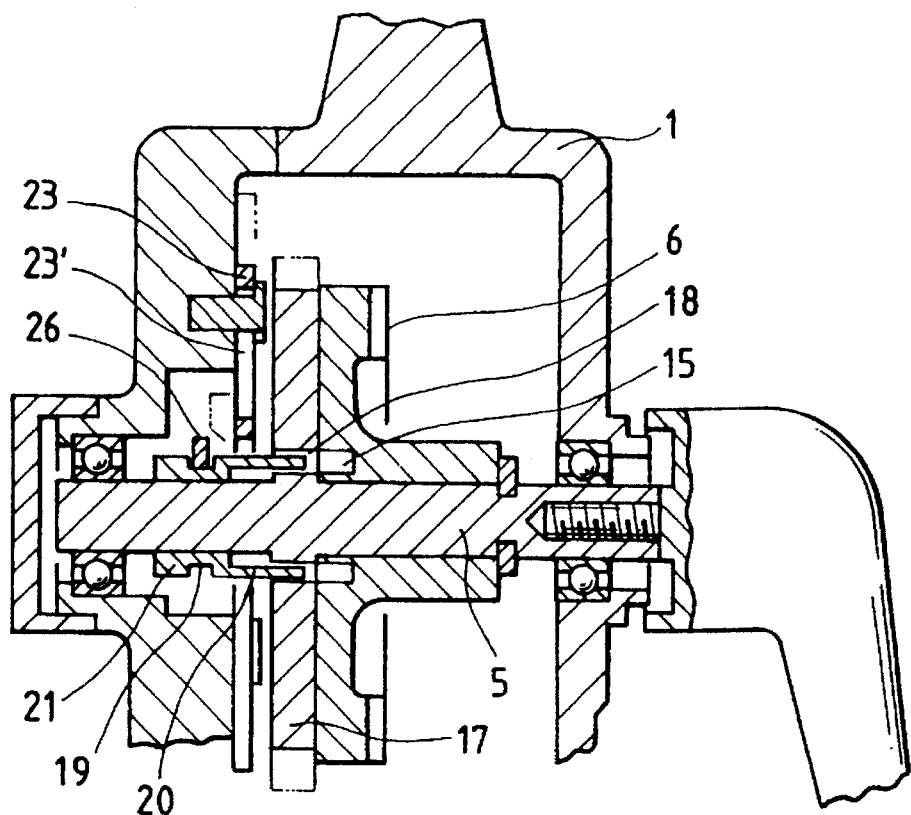
FIG. 4 is a cross-sectional view taken along the same line 3—3 but in the drag non-operation state.
Figure 5:
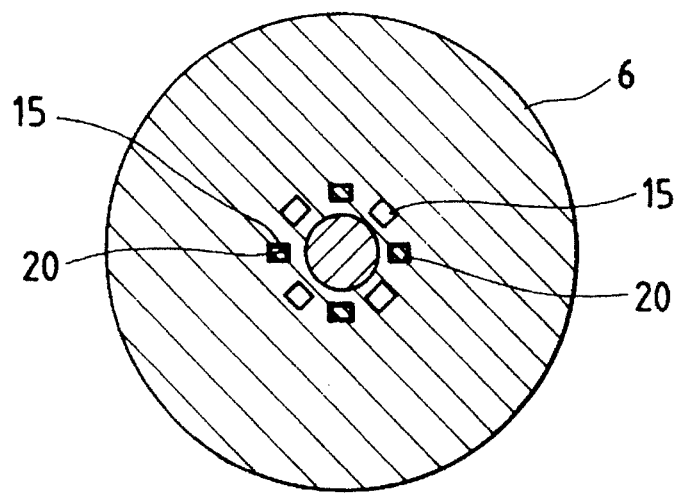
FIG. 5 is a cross-sectional view taken along line 5—5 of FIG. 3.
Figure 6:
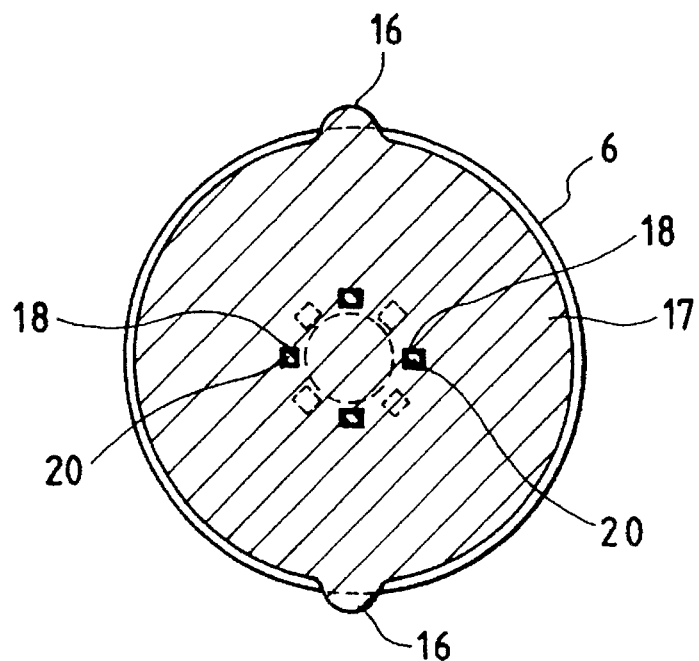
FIG. 6 is a cross-sectional view taken along line 6—6 of FIG. 3.

The drive gear 6 is rotatably fitted on the handle shaft 5 and is formed at its relatively central portion with clutch engagement holes 15 arranged in an annular manner with angular intervals as shown in FIGS. 4 and 5. A returning circular plate 17 having returning projections 16 at its peripheral portions is integrally secured to the handle shaft 5 and is located adjacent the drive gear 6. The central portion of the returning circular plate 17 is perforated as similarly to the drive gear 6 to form fitting insertion holes 18 (FIG. 6). Am best shown in FIG. 4, a clutch member 21 is fitted on the handle shaft 5. The clutch member 21 is formed at its outer circumference with an engagement groove 19, and at its one axial end with engagement claws 20 which is engageable with and disengageable from the clutch engagement holes 15 and which is fittingly insertable into the insertion holes 18.

Figure 2:
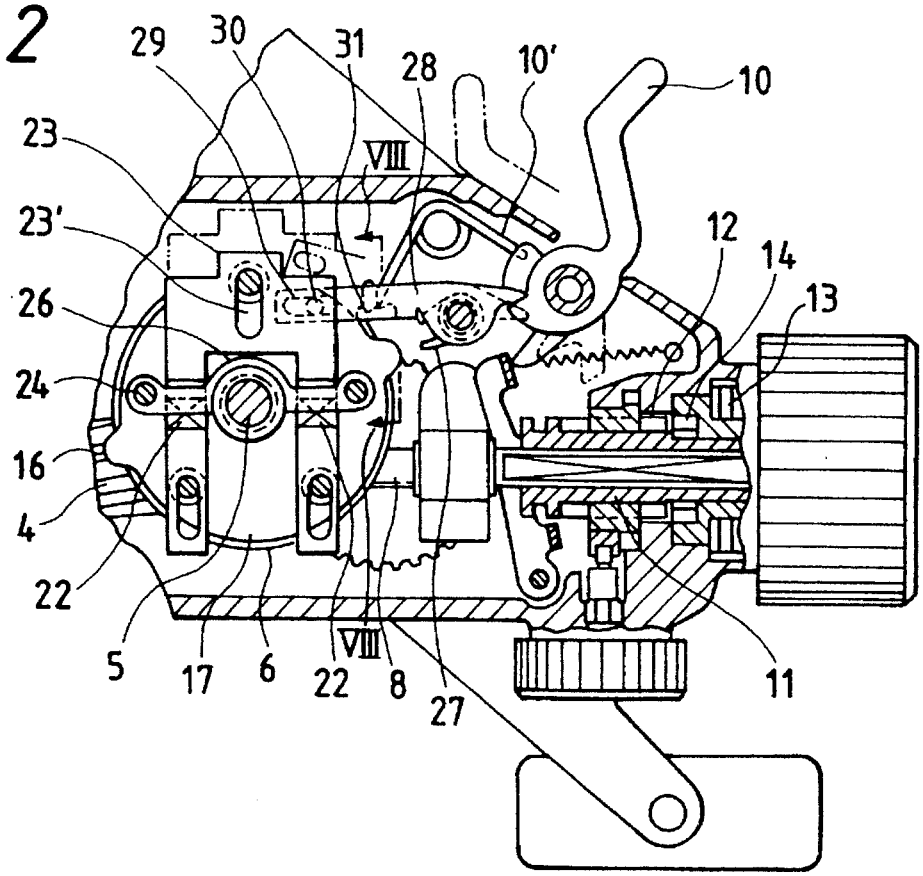
FIG. 2 is a longitudinally sectional, frontal view showing the reel in a drag non-operation state.
Figure 3:
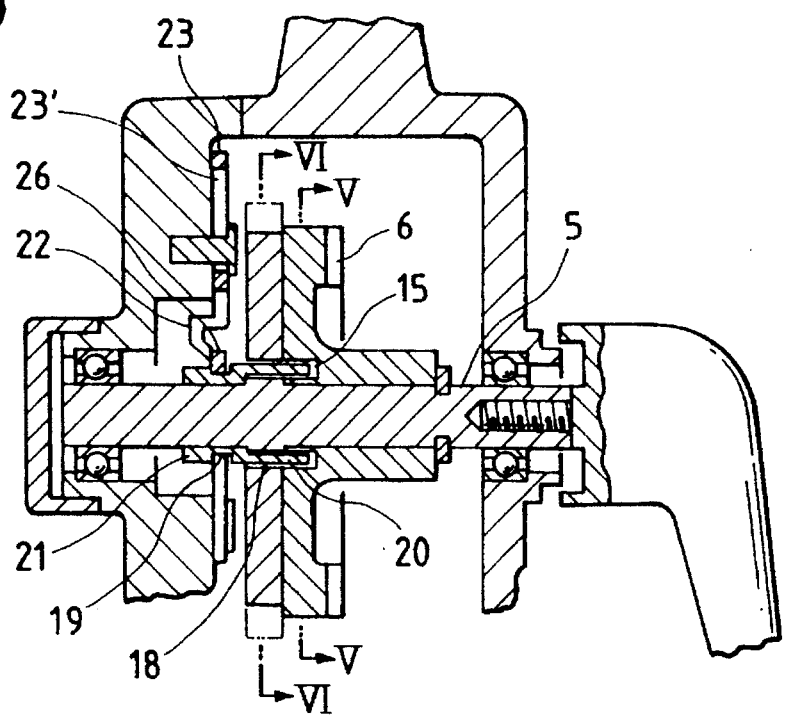
FIG. 3 is a cross-sectional view taken along line 3—3 of FIG. 1.
Figure 7:
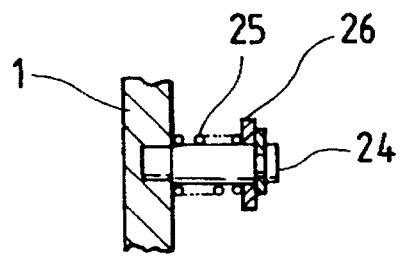
FIG. 7 is a cross-sectional view taken along line 7—7 of FIG. 1.
Figure 8:
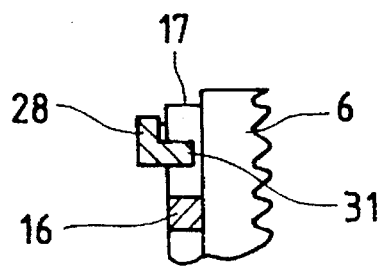
FIG. 8 is a cross-sectional view taken along line 8—8 of FIG. 1.

A clutch operation plate 23 having drive projections 22 on its surface is mounted on the reel casing 1 through elongated holes 23 so as to slide up and down with respect to the reel casing 1. A clutch plate 26 is engaged with the engagement groove 19 of the clutch member 21 so as to bias the engagement claws 20 of the clutch member 21 toward the drive gear 6 with the aid of a spring 25 wound on each stud 24 (FIG. 7). As shown in FIG. 1, when the clutch operation plate 23 is located at an upward position, the clutch plate 26 is not engaged with the drive projections 22, and therefore the engagement claws 20 are engaged with the clutch engagement holes 15 of the drive gear 6. On the other hand, when the clutch operation plate 23 is located at an downward position as shown in FIG. 2, the drive projections 22 drive the clutch plate 26 against the biasing force of the spring 25 so that a clutch member 21 is moved away from the drive gear 6, and thus the engagement claws 20 arc disengaged from the clutch engagement holes 15 of the drive gear 6.

A returning member 28 biased by a spring 27 is provided between the switching lever 10 and the returning circular plate 17 in such a manner that one end of the returning member 28 is engageable with the switching lever 10 whereas an engagement hole 29 in the other end is engaged with a projection 30 formed on the clutch operation plate 23. A projecting piece 31 provided on the returning member 28 is located on a rotation locus of the returning projection 16 of the returning circular plate 17 in the downward position.

An operation of a fishing reel thus constructed will be described hereunder. In a state where the engagement portion 12 of the engagement cylinder 11 on the spool shaft 8 is engaged with the engagement or coupling portion 14 of the drag mechanism as shown in FIG. 1, the reverse rotation of the spool shaft 8 is braked or restricted by the drag mechanism 13. If the switching lever 10 is switched to a position shown in FIG. 2 to await a strike by a fish, the engagement portion 12 of the engagement cylinder 11 on the spool shaft 8 is disengaged from the coupling portion 14 of the drag mechanism to put the spool shaft 8 into a free rotation state. In this free rotation state, when the handle shaft 5 is rotated in a fishline winding direction to hook the fish biting a bait, the engagement claws 20, which remain engaged with the fitting holes 18 as shown in FIG. 5, rotate the returning circular plate 17 so that the returning projection 16 collides with the projecting piece 31 of the returning operation piece 28, to thereby rotate the returning operation piece 28 in a clockwise direction. Thus, the switching lever 10 is returned to the original position shown in FIG. 1. Simultaneously, the end of the returning operation piece 28 drives the clutch operation plate 23 to move to the upward position wherein the depression or retainment of the drive projections 22 to the clutch plate 26 is released, so that the clutch plate 26 biases the clutch member 21 with the aid of the spring 25 to engage the engagement claws 20 with the clutch engagement holes 15. Thus, the drive gear 6 and the handle shaft 5 are made integrated with each other to transmit the rotation of the handle shaft 5 to the rotor 2 via the drive gear 6, pinion 4 and rotary quill 3, to thereby wind a fishline onto the spool 7.

In the fishing reel constructed in accordance with the present invention, during when a spool shaft is switched from a free rotation state to a drag operation state performed by a drag mechanism, a drive gear and a handle shaft are not directly connected to each other to prevent the unnecessary rotation of a rotor. Thus, it is possible to properly and precisely perform the hooking operation without any loss or lag of timing that is found in a conventional reel due to the unnecessary rotation of the rotor, and also to prevent the twist of the fishline.

What is claimed is:

1. A spinning reel for fishing, comprising:

a reel casing;

a spool shaft which reciprocates in an axial direction during rotation of a handle shaft, said spool shaft being linked to said handle shaft through a reciprocating mechanism located within said reel casing, wherein a spool is provided at a first axial end of the spool shaft and a drag mechanism is provided at a second axial end opposite from the first axial end;

a rotor for winding line onto said spool;

a switch means for selectively switching between a spool free state in which said spool shaft is decoupled from said drag mechanism and a drag state in which said spool shaft is operatively coupled to the drag mechanism;

a clutch means for selectively engaging the handle shaft with a drive gear, said clutch means being switched between a torque transmission state wherein the rotor is be driven through the drive gear by the handle shaft and a rotor free state wherein the rotor rotates independently of the handle shaft; and a return means, provided between the switching means and the clutch means, for returning both the spool from the spool free state to the drag state and the rotor from the rotor free state to the torque transmission state, during rotation of the handle shaft.

2. The spinning reel according to claim 1, wherein the switch means and the clutch means are simultaneously returned to the drag state and the torque transmission state, respectively, by said return means.

3. The spinning reel according to claim 1, wherein said switching means acts on said return means to switch the clutch means between said torque transmission state and said rotor free state.

4. The spinning reel according to claim 1, wherein the return means acts upon the clutch means to disengage the handle shaft from said drive gear to permit relative rotation therebetween, said handle shaft being disengaged from the drive gear when the drag mechanism is disengaged from the spool shaft by the switching means.

\* \* \* \* \*